United States Patent [19]

Yoshida et al.

[11] 4,323,434

[45] Apr. 6, 1982

[54] PROCESS FOR ELECTROLYSIS OF ALKALI CHLORIDE

[75] Inventors: Mitsuo Yoshida; Yoshinori Masuda; Akio Kashiwada, all of Nobeoka, Japan

[73] Assignee: Asahi Kasei Kogyo Kabushiki Kaisha, Osaka, Japan

[21] Appl. No.: 121,911

[22] Filed: Feb. 15, 1980

[30] Foreign Application Priority Data

Feb. 16, 1979 [JP] Japan .................. 54-16070

[51] Int. Cl.³ .................. C25B 1/34; C25B 13/08
[52] U.S. Cl. .................. 204/98; 204/128; 204/296
[58] Field of Search .................. 204/98, 128, 296

[56] References Cited

U.S. PATENT DOCUMENTS 3,773,634 11/1973 Stacey et al. .................. 204/98
4,021,327 5/1977 Grot .................. 204/296

*Primary Examiner*—R. L. Andrews
*Attorney, Agent, or Firm*—Birch, Stewart, Kolasch & Birch

[57] ABSTRACT

A homogeneous cation exchange membrane having at least one roughened surface, which is assembled in an electrolytic cell with the roughened surface facing toward the cathode side of the cell, is employed in the electrolysis of an alkali chloride in an electrolytic cell divided by a cation exchange membrane into an anode compartment and a cathode compartment to produce an alkali hydroxide. The electrolysis voltage can be considerably reduced at a high current efficiency to provide a great economical advantage.

6 Claims, 2 Drawing Figures

F I G. 1
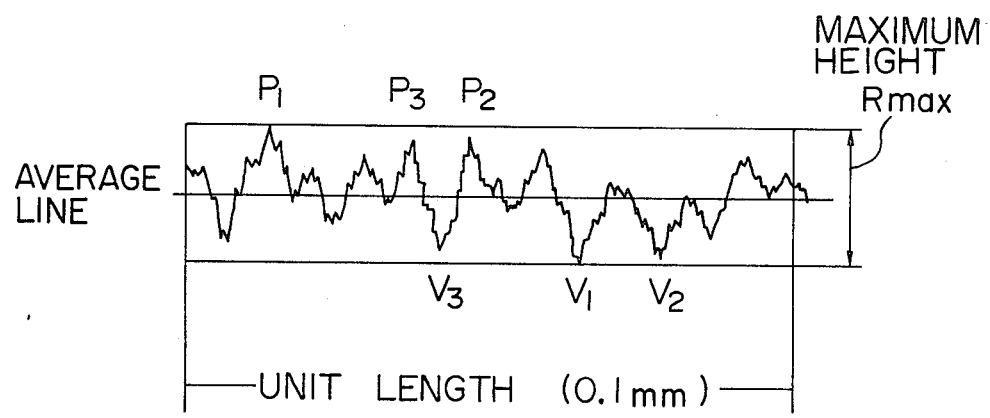
F I G. 2
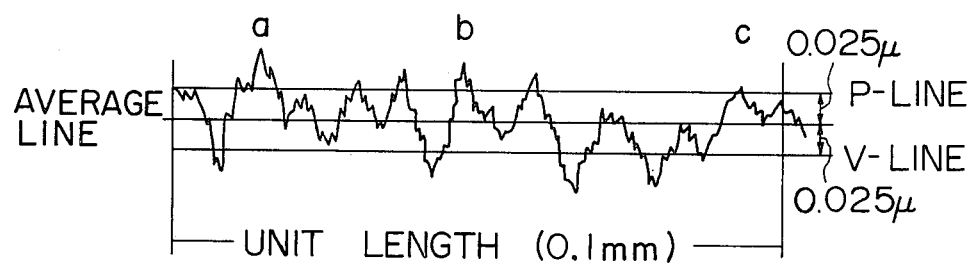

PROCESS FOR ELECTROLYSIS OF ALKALI CHLORIDE

This invention relates to an economical process for the electrolysis of alkali chloride by an ion-exchange membrane process. More particularly, this invention relates to a process for electrolysis of alkali chloride operable at lower electrolysis voltage, which comprises carrying out electrolysis of an alkali chloride in an electrolytic cell divided by a cation exchange membrane into the anode compartment and the cathode compartment to produce an alkali hydroxide wherein said cation exchange membrane is a homogeneous cation exchange membrane having a roughened face on at least one of the surfaces thereof and assembled in the electrolytic cell with said roughened face on the cathode side of the cell.

In the present invention, the "homogeneous cation exchange membrane" refers to a cation exchange membrane prepared only from ion-exchange resins without blending with thermoplastic resins having no ion-exchange group. Of course, such a membrane may be provided with backings of fibers or porous films for the purpose of reinforcement. It is also possible to laminate a film having different ion-exchange groups or ion-exchange capacities.

In the prior art, it has been proposed to lower the membrane resistance of a heterogeneous ion-exchange membrane comprising an ion-exchange resin and a thermoplastic resin by roughening the surface thereof by brushing or flame treatment to thereby expose the ion-exchange resin on the membrane surface, as is disclosed by Japanese published unexamined patent application No. 47590/1977. However, in a homogeneous ion-exchange membrane consisting only of ion-exchange resins wherein the ion-exchange resin is itself exposed on the membrane surface, there is no such decrease in membrane resistace by application of such a roughening treatment. Furthermore, in using a homogenous cation exchange membrane, it is generally known that bubbles of hydrogen gas generated from the cathode will be adsorbed on the membrane surface if the surface on the cathode side is not smooth, whereby the electrolysis voltage is increased. For prevention of this phenomenon, it has generally been practiced in the art to assemble a cation exchange membrane so as to face the smooth surface of the membrane toward the cathode, as is disclosed by Japanese published unexamined patent application No. 131489/1976.

Generally speaking, a cation exchange membrane to be used in the electrolysis of alkali chloride by an ion-exchange membrane process is desired to have a thickness of 1000 microns or less, preferably 200 microns or less, in order to have smaller membrane resistance. Insufficient strength of such a thin film is reinforced with support fibers. According to one method known in the art (hot press laminate method), a thermoplastic ion-exchange membrane intermediate prepared by extrusion molding is superposed on support fibers and subjected to a hot press, thereby embedding the support fibers in the membrane. According to another method (vacuum laminate method, as is disclosed by Japanese published examined patent application No. 14670/1977), only one surface of the thermoplastic ion-exchange membrane intermediate is subjected to hydrolysis to convert it to a non-thermoplastic condition and then the opposite thermoplastic surface is brought in contact with the support fibers and the side contacted with the support fibers is evacuated while placing the whole composite under heating. Both surfaces can be made smooth by the hot press laminate method. On the other hand, the previously hydrolyzed surface is made smooth by the vacuum laminate method. In the prior art, ion-exchange membranes have been assembled in electrolytic cells so that such smooth surfaces may face toward the cathode side.

Unexpectedly, the present inventors have found as the result of observations of electrolysis that the amount of hydrogen gas bubbles generated from the cathode adsorbed on the membrane surface is the least when the homogeneous cation exchange membrane is moderately roughened on its cathode side, whereby the electrolysis voltage is the lowest.

That is, according to the present invention, the specific feature resides in using a homogeneous cation exchange membrane having a roughened face on at least one of the surfaces thereof and assembling such a cation exchange membrane with said roughened face on the cathode side of the cell, when carrying out electrolysis of an alkali chloride in an electrolytic cell divided by a cation exchange membrane into the anode compartment and the cathode compartment to produce an alkali hydroxide. Its specific effect is to lower the electrolysis voltage remarkably without decrease in current efficiency.

In the electrolysis of an alkali chloride by an ion-exchange membrane process, there is advantageously used a two-compartment system in which the anode compartment and the cathode compartment are divided by one sheet of cation exchange membrane. As such a cation exchange membrane, there may usually be used a fluorocarbon type homogeneous cation exchange membrane which is excellent in heat resistance, chemical resistance and mechanical strength.

There have been proposed various improvements of such fluorocarbon type cation exchange membranes in the prior art for the purpose of increasing current efficiency for production of alkali hydroxide and lowering electrolysis voltage. However, since it is generally difficult to incorporate a crosslinked structure in a fluorocarbon type cation exchange membrane, improvement of current efficiency is frequently accompanied by increase of electrolysis voltage, while decrease of voltage will result in decrease in current efficiency. This is because both of these properties are influenced by changes in water content. Whereas, according to the present invention, electrolysis voltage can be reduced while maintaining the current efficiency of the homogeneous cation exchange membrane at higher values.

The reason why the electrolysis voltage can be lowered by assembling the cation exchange membrane so as to face the roughened surface toward the cathode side may be considered as follows. That is, bubbles of hydrogen gas generated from the cathode by electrolysis are difficultly adsorbed on such roughened surface. Adsorption of hydrogen gas bubbles on the membrane on the cathode side will cause elevation of electrolysis voltage through (1) electrical shielding of adsorbed bubbles and (2) decrease in diffusion velocity of highly concentrated alkali hydroxide at the membrane-liquid interface.

On the other hand, chlorine gas formed on the anode by electrolysis has larger bubble diameters as compared with hydrogen gas and therefore it is difficultly adsorbed on the homogeneous cation exchange membrane on the anode side. For this reason, it is not necessarily required to roughen the homogeneous cation exchange membrane on the anode side for the purpose of lowering electrolysis voltage.

The roughened surface of the present invention is an opposite conception from the glassy surface. According to a preferred embodiment of the present invention, the roughened surface may quantitatively be defined as a surface having a concavo-convex structure such that the maximum height is 0.05 micron or more and at least 20 concavo-convex portions per unit length (1 mm) have a roughness of 0.05 micron or more. More preferably, the maximum height may be 0.05 to 5 microns and there are at least 30 concavo-convex portions per 1 mm with a roughness of 0.05 micron or more, whereby gas adsorption on the membrane surface can be made very small. With a maximum height less than 0.5 micron, the effect for prevention of the membrane surface from gas adsorption is small. Also the gas adsorption prevention effect is insufficient if the number of concavo-convex portions with a roughness of 0.05 micron or more per 1 mm is less than 20. There is no particular upper limit for the number of concavo-convex portions with a roughness of 0.05 micron or more per 1 mm, but the number is usually not more than 250.

In the accompanying drawings, FIG. 1 shows a curve for illustrating the method for determination of a maximum height; and FIG. 2 that for determination of the number of concavo-convex portions with 0.05 micron or more.

The degree of gas adsorption on the membrane surface can be detected by, for example, observation of the membrane surface by carrying out electrolysis in an electrolytic cell made of transparent acrylic resin having the membrane to be measured assembled therein.

Measurement of the surface roughness of a cation exchange membrane is possible by the stylus method using an instrument for the measurement of surface roughness (Type Surfcom 60 B, Tokyo Seimitsu K.K.). When a stylus is contacted on a membrane surface and traversed thereon, there occurs an up and down movement on the stylus according to the concavo-convex irregularities. This up-down movement is converted to an electrical signal which is then recorded on a recording paper. Usually a cation exchange membrane is flexible enough to be deformed by contact with a stylus. Hence, it is desirable to use a pick-up having a round shape of 10 $\mu$mR or more at the tip of the stylus and a measuring force of 0.1 g or less. In the present invention, there is employed a pick-up having a shape of 13 $\mu$mR at the tip of the stylus and a measuring force of 0.07 g. A cation exchange membrane is frequently reinforced with support fibers and such a reinforced membrane has large concavo-convex portions (surface waviness) due to support fibers. In order to determine the surface roughness from said surface waviness, it is desirable to cut off longer wavelengths than certain predetermined wavelengths by passing electrical signals through an electrical filter. In the present invention, the measurement is conducted by setting the cut-off value at 0.032 mm.

The maximum height mentioned in the present invention is measured by the method similar to JIS B0601 according to the following procedure. A unit length of 0.1 mm is cut out from the roughness curve measured at the cut-off value of 0.032 mm and the interval in the vertical direction of the roughness curve sandwiched between the two straight lines in parallel to the average line is to be measured. For example, in FIG. 1, among the straight lines in parallel to the average line in the section cut out in unit length 0.1 mm, the interval R max between the line passing the highest peak $P_1$ and the lowest valley $V_1$ is called the maximum height. Measurements are carried out for 10 times by changing the places in the same sample and the mean value is calculated from the measured values. In determination of such a maximum height, unit length should be cut out only from portions having no exceptionally high peak or valley which is to be regarded as a crack.

The number of concavo-convex portions per 1 mm with a roughness of 0.05 micron or more is determined in the present invention by the method similar to U.S. SAE Standard J911 according to the following procedure. In the unit length (0.1 mm) cut out from the roughness curve measured at the cut-off value of 0.032 mm, there are drawn two straight lines, one (P-line) being (+) 0.025 micron apart from the average line, the other (V-line) being (−) 0.025 micron apart from the average line. A concavo-convex portion passing the V-line and then the P-line is counted as one peak and the number of such peaks per 0.1 mm is counted. For example, in FIG. 2, the number of peaks passing first the V-line and then the P-line is three (a, b and c). Measurements are conducted at 10 different places in the same sample and the mean value is determined to give the number per 1 mm.

In the present invention, the homogeneous cation exchange membrane having at least one roughened surface may preferably be a fluorocarbon type homogeneous cation exchange membrane through which catholyte or anolyte is substantially impermeable under water pressure. If anolyte or catholyte is permeable through the membrane under water pressure, the product produced by electrolysis of an aqueous alkali chloride solution is disadvantageously degraded in quality. As such fluorocarbon type homogenous cation exchange membranes, there are (1) sulfonic type cation exchange membranes, (2) sulfonamide type cation exchange membranes and (3) carboxylic type cation exchange membranes. However, the present invention is not limited to these membranes, but there may be employed all homogeneous cation exchange membranes.

Typical examples of methods for preparation of these fluorocarbon type homogeneous cation exchange membranes are set forth below.

(1) A sulfonic type cation exchange membrane can be prepared by hydrolysis of a film of a copolymer of $CF_2=CFOCF_2CF(CF_3)OCF_2CF_2SO_2F$ and tetrafluoroethylene (Nafion ®, E. I. Du Pont de Nemours, Inc.);

(2) A sulfonamide type cation exchange membrane can be prepared by reacting the aforesaid copolymer with ammonia, an alkyl mono-amine or diamine (Japanese published unexamined patent applications No. 44360/1973, No. 66488/1975, No. 64495/1976, No. 64496/1976, etc.);

(3) A carboxylic type cation exchange membrane can be prepared by incorporating necessary ion-exchange groups into a copolymer of a fluorinated olefin and $CF_2=CFO(CF_2)_nA$ or $CF_2=CFOCF_2(CFXOCF_2)_m(CFX')_m(CF_2OCFX'')_nA$ (wherein A is CN, COF, COOH, COOM, COOR, $CONR_2R_3$; X, X' and X'' are F or $CF_3$) (Japanese published unexamined patent applications No. 130495/1976 and No. 36486/1977); or (4) by subjecting a copolymer of a fluorinated olefin and $CF_2=CF(OCF_2CFX)_nOCF_2CF_2SO_2Y$ (wherein Y is a halogen atom, OH group or an alkyl) to treatment with a reducing agent (Japanese published unexamined patent applications No. 24175/1977, No. 24176/1977 and No. 24177/1977).

There may be employed various methods for roughening the surface of a homogeneous cation exchange membrane as follows:

(1) A method wherein extrusion molding of an ion-exchange membrane is effected through a die having a certain concavo-convex pattern;

(2) A method wherein an ion-exchange membrane is passed through rotating rolls having a certain concavo-convex pattern;

(3) A method wherein an ion-exchange membrane is subjected to a hot press together with a cloth, paper, or fine powders of organic or inorganic material;

(4) A method wherein an ion-exchange membrane is subjected to abrasion on its surface with abrasive materials;

(5) A method wherein an ion-exchange membrane is passed through rotating rolls provided with sandpapers on their surface;

(6) A method wherein abrasive materials are blasted on the surface of an ion-exchange membrane;

(7) A method wherein an ion-exchange membrane is subjected to abrasion on its surface with a metal brush;

(8) A method involving a discharging treatment such as arc discharge or glow discharge;

(9) A method by irradiation of ultra-violet rays, X-rays, an electron beam or other radiations on the surface of a membrane;

(10) A method by treatment with a gas flame or hot air;

(11) A method by treatment of an ion-exchange membrane with a solvent;

(12) A method wherein a mesh or non-woven fabric made of an ion-exchange membrane is bonded on the surface of a membrane.

These methods are merely exemplary and not limitative of the present invention.

The roughening treatment may be utilized on both surfaces of ion-exchange membranes, but a desirable decrease in electrolysis voltage can be attained by application of a roughening treatment on only one surface, if said treated surface is positioned so as to face toward the cathode side in carrying out electrolysis. In membranes comprising two-layers with different equivalent weights or comprising sulfonic acid layers and weakly acidic layers, it is desirable to apply a roughening treatment on the layer with the higher equivalent weight or on the weakly acidic layer. The roughening treatment of the present invention may also be applied on an ion-exchange membrane intermediate. Such an ion-exchange membrane intermediate after roughening treatment is subjected to such treatment as hydrolysis or introduction of ion-exchange groups to be provided for use as a cation exchange membrane.

As an alkali chloride to be used in the present invention, there may be mentioned lithium chloride, sodium chloride and potassium chloride. As the alkali hydroxide, lithium hydroxide, sodium hydroxide and potassium hydroxide are included.

The most important point in carrying out the electrolysis process according to the present invention is to assemble a homogeneous cation exchange membrane in an electrolytic cell so that the roughened surface of the membrane may face toward the cathode side. If the roughened surface is allowed to face the anode side, it is not possible to achieve decreased electrolysis voltage.

Referring now to preferable electrolytic cell and electrolysis conditions to be used in the present invention, electrolysis is performed while feeding an aqueous alkali chloride solution into the anode compartment and water or a dilute aqueous alkali hydroxide solution into the cathode compartment, thereby controlling the alkali hydroxide concentration at the outlet of the cathode compartment.

The aqueous alkali chloride solution to be fed into the anode compartment may be purified according to conventional methods used in the prior art of electrolysis of an alkali chloride. That is, the aqueous alkali chloride solution recycled from the anode compartment may be subjected to such treatments as dechlorination, dissolving of alkali chloride to saturation, precipitation separation of magnesium, calcium or iron and neutralizaion. The steps may be conducted similarly as in the prior art. If desired, however, the feed aqueous alkali chloride solution may desirably be purified by granular ion-exchange resins, especially chelate resins, to a permissible calcium content, preferably 1 ppm or less. The concentration of an aqueous alkali chloride solution may preferably be as high as possible, namely approximately saturated.

The percentage utilized of alkali chloride fed into the anode compartment, which is 5 to 95% depending on the current density and the method for removing heat, is generally desired to be as high as possible. The electrolysis temperature may be in the range from 0° to 150° C.

The heat generated by electrolysis may be eliminated by cooling a part of the anolyte or catholyte.

There are also formed chlorine and hydrogen gases from the anode compartment and the cathode compartment, respectively. Such gases can be led to the backside of the electrodes to ascend therethrough in a specifically devised electrolytic cell, to give a specific effect of decreasing electrolysis voltage which results in smaller power consumption.

It is also desirable to stir the electrolyte in each compartment with gases formed from the cathode and anode compartments in addition to the stirring caused by the liquids supplied from the outside. For this purpose, a porous electrode such as a metal mesh electrode may preferably be used for effecting stirring with ascending flow of gases to move the liquid in each compartment under circulation.

In the electrodes employed, the cathode may advantageously be made of iron or iron plated with nickel or a nickel compound from the standpoint of overvoltage. On the other hand, the anode may be made desirably of a metal mesh coated with a noble metal oxide such as ruthenium oxide.

The present inventin is further explained with reference to the following Examples, by which the present invention is not limited.

EXAMPLE 1

Tetrafluoroethylene and perfluoro-3,6-dioxa-4-methyl-7-octenesulfonyl fluoride were copolymerized in 1,1,2-trichloro-1,2,2-trifluoroethane, using perfluoropropionyl peroxide as polymerization initiator, at a polymerization temperature of 45° C. while maintaining the pressure of tetrafluoroethylene at 3 $Kg/cm^2$-G. A part of the resultant copolymer was washed with water and then hydrolyzed. The equivalent weight (weight of dry resin containing one equivalent of ion-exchange groups) is measured by the titration method to be 1090. This copolymer was molded under heating into a film having a uniform thickness of 250 microns and then subjected to a roughening treatment by the liquid honing method.

The liquid honing method is a method in which abrasive materials suspended in water are blasted by compressed air onto the object to be abraded. In this Example, the roughening treatment was conducted by blasting alumina powders with average particle diameters of 10 microns (WA#1500, produced by Fujimi Kenmazai K.K.) suspended in water onto one surface of the film using a compressed air of 3.5 Kg/cm$^2$. Blasting was continued for 2 minutes per 1 dm$^2$ of the film. As the result of said treatment, there was obtained a roughened film having on one surface a concavo-convex structure wherein the maximum height was 0.25 micron and wherein about 55 concavo-convex portions with a roughness of 0.05 micron or more were present per 1 mm.

The film thus roughened on its surface was then hydrolyzed in 2.5 N caustic soda and 50% methanol at 60° C. for 16 hours. After hydrolysis, the concavo-convex portion on the roughened surface was found to remain substantially the same as before hydrolysis.

The thus prepared film was assembled in a transparent electrolytic cell made of acrylic resins so that the roughened surface faces toward the cathode side, and electrolysis of sodium chloride was performed at current a density of 50 A/dm$^2$ at the electrolysis temperature of 90° C. The anode employed was a dimensionally stable electrode comprising titanium substrate coated with ruthenium oxide, while the cathode is made of an iron mesh. Into the anode compartment was fed an aqueous 3 N sodium chloride solution of pH 2, while into the cathode compartment an aqueous 5 N caustic soda solution. The electrolysis voltage was found to be 2.97 V at the current efficiency of 60%. On the cathode side of the cation exchange membrane, no hydrogen gas bubbles were adsorbed.

Said membrane was found to have a resistance of 2.2 ohm.cm$^2$, as measured by the alternate current method in 0.1 N caustic soda.

Comparative Example 1

Electrolysis was conducted in the same manner as in Example 1 except that there was used a membrane which had not been subjected to the roughening treatment.

As the result, the electrolysis voltage was 3.20 V at the current efficiency of 59.5%. There was observed adsorption of hydrogen gas bubbles very much on the cathode side of the membrane which had no roughened surface.

The membrane prepared without said roughening treatment was found to have a resistance of 2.2 ohm.cm$^2$.

EXAMPLE 2

Tetrafluoroethylene and perfluoro-3,6-dioxy-4-methyl-7-octenesulfonyl fluoride were copolymerized in 1,1,2-trichloro-1,2,2-trifluoroethane, using perfluoropropionyl peroxide as polymerization initiator, at a polymerization temperature of 45° C. while maintaining the pressure of tetrafluoroethylene at 5 Kg/cm$^2$. The resultant copolymer is called Polymer 1. The same procedure was repeated except that the pressure of tetrafluoroethylene was changed to 3 Kg/cm$^2$. The resultant copolymer is called Polymer 2.

A part of the copolymers, respectively, was washed and hydrolyzed. Then, each copolymer was subjected to measurement of equivalent weight (EW) by the titration method, whereby Polymer 1 was found to have an EW of 1500 and Polymer 2 an EW of 1110.

Polymers 1 and 2 were molded under heating into a two-layer laminate with the thickness of Polymer 1 being 50 microns and that of Polymer 2 being 100 microns. Furthermore, a fabric made of Teflon ® was embedded by the vacuum laminate method from the surface of the Polymer 2 to prepare a composite material, which was then subjected to hydrolysis treatment to give a sulfonic type ion-exchange membrane.

The surface of polymer 1 is called the A-surface.

Said sulfonic type ion-exchange membrane was roughened according to the following method.

A silicone rubber sheet (upper layer) with a thickness of 3 mm, a layer of light weight magnesium oxide powders (produced by Wako Junyaku Kogyo K.K.) with a thickness of 1 mm, a wetted sulfonic type cation exchange membrane (A-surface facing upward), a silicone rubber with a thickness of 3 mm and a 60-mesh metal net (bottom layer) were laminated and subjected to a hot press under the pressure of 10 Kg/cm$^2$ while heating at 280° C. for 10 minutes. Then, magnesium oxide adhered on the membrane was removed by dissolving with hydrochloric acid.

The roughness of the A-surface of said roughened cation exchange membrane was measured to find that the maximum height was 0.6 micron and wherein there were formed about 45 concavo-convex portions with a roughness of 0.05 micron or more per 1 mm.

The thus prepared membrane was assembled in a transparent electrolytic cell made of acrylic resins with the A-surface facing toward the cathode side and electrolysis of sodium chloride was conducted similarly as in Example 1. The electrolysis voltage was found to be 3.75 V at the current efficiency of 80%. There were no hydrogen bubbles adsorbed on the cathode side of the membrane. The resistance of said membrane was found to be 6.3 ohm.cm$^2$.

EXAMPLE 3

The same sulfonic type cation exchange membrane reinforced with Teflon ® fabric as used in Example 2 was roughened according to the following method.

A silicone rubber sheet with a thickness of 3 mm (upper layer), a cotton cloth, a wetted sulfonic type ion-exchange membrane (A-surface facing upward), a silicone rubber sheet with a thickness of 3 mm and a 60-mesh metal net (bottom layer) were laminated and subjected to a hot press under the pressure of 10 Kg/cm$^2$ while heating at 250° C. for 10 minutes. Then, by treatment with a hot aqueous hypochlorite solution, the cotton cloth adhered on the membrane was removed. The surface roughness of the A-surface of the roughened cation exchange membrane was measured to find that the maximum height was 2.5 microns and that there were formed about 30 concavo-convex portions with roughness of 0.05 micron or more per 1 mm.

The thus prepared membrane was assembled in a transparent electrolytic cell made of acrylic resins with the A-surface facing toward the cathode side and electrolysis of sodium chloride was carried out similarly as in Example 1. The electrolysis voltage was found to be 3.80 V at the current efficiency of 80%. There was almost no hydrogen gas bubble adsorbed on the cathode side of the membrane. Said membrane was found to have a resistance of 6.3 ohm.cm$^2$.

COMPARATIVE EXAMPLE 2

Electrolysis was conducted in the same manner as in Example 2 except for using a membrane prepared without the roughening treatment in place of the membrane used in Example 2 subjected to the hot press for roughening treatment.

The electrolysis voltage was 4.05 V at the current efficiency of 79.5%. There was considerable adsorption of hydrogen gas bubbles on the cathode side of the membrane which had not been subjected to roughening treatment. The membrane without application of the surface roughening treatment was also found to have a resistance of 6.3 ohm.cm$^2$. Examples 4 to 6, Comparative examples 3 and 4

According to the procedure similar to Example 1, there were prepared a copolymer having an EW of 1350 (Polymer 1) and a copolymer having an EW of 1090 (Polymer 2) by copolymerization of tetrafluoroethylene with perfluoro-3,6-dioxy-4-methyl-7-octenesulfonyl fluoride. These polymers were molded under heating into a two-layer laminated film with a thickness of 35 microns for Polymer 1 and 100 microns for Polymer 2. Furthermore, a Teflon ® fabric was embedded by the vacuum laminate method from the side of Polymer 2. Said laminated product was hydrolyzed to obtain a sulfonic type ion-exchange membrane, which was in turn subjected to treatment with a reducing agent only on the surface of Polymer 1 to convert sulfonic groups on said surface to carboxylic groups (A-surface).

The A-surface of said cation exchange membrane was then subjected to the roughening treatment by the liquid honing method. In these Examples, a water suspension of emery with an average particle diameter of 10 microns (FO#1200, produced by Fujimi Kenmazai K. K.) was blasted by compressed air of 3 Kg/cm$^2$. The blasting period was varied at 10, 30, 60 and 120 seconds per 1 dm$^2$.

The surface roughness of the A-surface obtained by each treatment was measured to give the results as shown in Table 1. Each of the resultant membranes was assembled in an electrolytic cell with the A-surface facing toward the cathode side and electrolysis was carried out similarly as in Example 1. The adsorption of hydrogen gas bubbles on the membrane surface was observed, and the electrolysis voltage and current efficiency were also measured. The results are also given in Table 1.

EXAMPLE 7

According to the procedure as described in Example 1, tetrafluoroethylene and perfluoro-3,6-dioxy-4-methyl-7-octenesulfonyl fluoride were copolymerized to obtain a polymer having an EW of 1200. Said polymer was molded under heating into a film of 125 microns in thickness, which was then subjected to treatment on only one surface having a ammonia gas to form a sulfonamide layer with thickness of 20 microns (A-surface).

Then, a Teflon ® fabric was embedded from the side opposite to the A-surface, followed by hydrolysis to obtain a sulfonamide type cation exchange membrane.

Said cation exchange membrane was roughened on its surface according to the dry blast method. The dry blast method is a method wherein abrasive materials are blasted by means of compressed air onto the object to be abraded. In this Example, alumina powders with an average particle diameter of 20 microns (WA#800, produced by Fujimi Kenmazai K. K.) were blasted by means of compressed air of 2 Kg/cm$^2$ onto the A-surface. Blasting was continued one minute per 1 dm$^2$ of the membrane. By said surface roughening treatment, there were formed about 45 concavo-convex portions with a roughness of 0.05 micron or more, with maximum height of 0.5 micron, per 1 mm.

The thus prepared cation exchange membrane was assembled in an electrolytic cell with the roughened surface (A-surface) facing toward the cathode side and electrolysis was carried out similarly as in Example 1. In this Example, electrolysis was conducted at the current density of 30 A/dm$^2$. The electrolysis voltage was found to be 3.55 V at the current efficiency of 84%. There was substantially no adsorption of hydrogen gas bubble on the cathode side of the cation exchange membrane.

Comparative example 5

In place of the sulfonamide type cation exchange membrane subjected to surface roughening treatment employed in Example 7, there was used a sulfonamide type cation exchange membrane without surface roughening treatment to repeat the electrolysis of Example 7.

The electrolysis voltage was found to be 3.85 V at the current efficiency of 83.5%. There was observed hydrogen gas bubbles adsorbed very much on the cathode side of the cation exchange membrane.

Example 8, Comparative example 6

In a film made of a copolymer of tetrafluoroethylene and $CF_2=CFO(CF_2)_3COOCH_3$ and having an EW of 650 and a thickness of 250 microns was embedded a Teflon ® fabric according to the hot press lamination method.

TABLE 1

|  | Blasting period (sec.) | Maximum height ($\mu$) | Concavo-convex of 0.05 $\mu$ or more | Gas adsorption | Electrolysis voltage (V) | Current efficiency (%) |
| --- | --- | --- | --- | --- | --- | --- |
| Comparative example 3 | 0 | 0.04 | 4/mm | very much | 4.05 | 96.0 |
| Comparative example 4 | 10 | 0.20 | 11/mm | much | 4.00 | 95.8 |
| Example 4 | 30 | 0.27 | 25/mm | scarcely none | 3.80 | 96.0 |
| Example 5 | 60 | 0.30 | 50/mm | none | 3.75 | 96.2 |
| Example 6 | 120 | 0.32 | 58/mm | none | 3.75 | 95.8 |

Said laminated product, after being subjected to the roughening treatment similarly as in Example 1 on only one surface, was hydrolyzed to obtain a carboxylic type ion-exchange membrane.

The roughness of the ion-exchange membrane was measured to find that there were formed on the roughened surface (A-surface) about 55 concavo-convex portions with a roughness of 0.05 micron or more, with a maximum height of 0.25 micron, per 1 mm. On the surface, on which no roughening treatment had been applied, there were only three concavo-convex portions with a roughness of 0.05 micron or more, with a maximum height of 0.04 micron, per 1 mm.

said ion-exchange membrane was assembled in an electrolytic cell to repeat electrolysis as described in Example 1. In this Example, however, electrolysis was carried out at a current density of 20 A/dm$^2$, using an aqueous sodium chloride solution of pH 3 and aqueous caustic soda solution of 13 N. The results obtained are as follows:

|  | Electrolysis voltage | Current efficiency | Remark |
| --- | --- | --- | --- |
| When facing A-surface toward cathode | 3.47 V | 95% | Example 8 |
| When facing A-surface toward anode | 3.75 V | 94.5% | Comparative example 6 |

EXAMPLE 9

A polymer having an EW of 1200 was prepared by copolymerization of tetrafluoroethylene with perfluoro-3,6-dioxy-4-methyl-7-octenesulfonyl fluoride. This polymer was molded under heating into a membrane of 125 microns in thickness, in which membrane was then embedded a Teflon ® fabric according to the vacuum laminate method. The laminate thus prepared was subsequently subjected to hydrolysis to obtain a sulfonic type cation exchange membrane.

The above cation exchange membrane was subjected to treatment with a reducing agent only on the surface (A) opposite to that in which the Teflon ® fabric was embedded to form carboxylic acid layer to prepare a carboxylic type cation exchange membrane. Then, said surface A was abraded to be roughened by use of a cleanser (trade name: Nissen Cleanser, produced by Nissen Cleanser, main shop) and a scrubbing brush made of nylon. The roughness was measured to find that the maximum height was 0.5 micron and there were formed about 55 concavo-convex portions of 0.05 micron or more per 1 mm.

Electrolysis was performed in the same manner as in Example 1 by assembling said cation exchange membrane in the electrolytic cell so that the A-surface faced toward the cathode side. As the result, the electrolysis voltage was found to be 3.85 V at the current efficiency of 93%. There was observed no hydrogen gas bubble adsorbed on the cathode surface of the cation exchange membrane.

We claim:

1. In a process for electrolysis of an alkali chloride which comprises carrying out electrolysis of an alkali chloride in an electrolytic cell divided by a cation exchange membrane into an anode compartment and a cathode compartment to produce an alkali hydroxide, the improvement which comprises using as said cation exchange membrane a homogeneous cation exchange membrane having at least one roughened surface, said roughened surface having a concavo-convex structure such that there are at least 20 concavo-convex portions with a roughness of 0.05 micron or more per unit length of 1 mm, said roughness being measured by a stylus method using a pick-up having a shape of 13 $\mu$m R at the tip of the stylus and a measuring force of 0.07 g and a wavelength cut-off value of 0.032 mm, said membrane being assembled in the electrolytic cell with at least one roughened surface facing toward the cathode side of the cell.

2. A process for electrolysis of an alkali chloride according to claim 1, wherein said cation exchange membrane is a fluorocarbon type homogeneous cation exchange membrane.

3. A process for electrolysis of an alkali chloride according to claim 1, wherein said membrane is a sulfonic type cation exchange membrane.

4. A process for electrolysis of an alkali chloride according to claim 1, wherein said membrane is a sulfonamide type cation exchange membrane.

5. A process for electrolysis of an alkali chloride according to claim 1, wherein said membrane is a carboxylic type cation exchange membrane.

6. A process for electrolysis of an alkali chloride according to claim 1, wherein said alkali chloride is an aqueous sodium chloride solution.

* * * * *